United States Patent Office 3,480,455
Patented Nov. 25, 1969

3,480,455
PAPER COATING COMPOSITION
Charles A. Richardson, Cohasset, Minn., assignor to Blandin Paper Company, Grand Rapids, Minn., a corporation of Minnesota
No Drawing. Filed Mar. 2, 1966, Ser. No. 531,092
Int. Cl. C09h 11/00; C09d 3/04; C08h 1/00
U.S. Cl. 106—137                                5 Claims

ABSTRACT OF THE DISCLOSURE

Coating compositions useful in the manufacture of publication papers are prepared as oil-in-water emulsions containing pigment, water-soluble gum, and an alkali-soluble, water insoluble protein which has been made water soluble by pH adjustment These coating compositions are prepared by first forming an oil-in-water emulsion containing the solubilized protein and gum, and thereafter adding pigment to the emulsion. A typical coating composition will contain a liquid hydrocarbon, water, soya protein, finely divided pigment, and animal glue or polyvinyl alcohol.

---

This invention relates to paper coating compositions, to papers coated therewith and to methods of preparing the compositions and coatings.

The advantages of using a coating composition consisting of an emulsion of a liquid hydrocarbon in an alkaline solution of a protein in water were first taught by Kress and Johnson in U.S. Patent No. 2,339,707, that issued Jan. 18, 1944. They stated that their composition could be applied in the usual manner to the formed web or paper sheet at the size press or by any other of the various procedures used for coating paper after sheet formation. After application the paper was dried. Their coating composition provided a means for brightening and opacifying the finished sheet, as well as for increasing the oil resistance and strength of the sheet.

The Kress coating composition had several serious limitations, the main one being an extremely low solids content on the order of 12 to 16%, which resulted in coating weights that were too low for practical use. Another limitation was the fact that the resulting coatings were extremely soft and pressure-sensitive. At the time of the Kress application, the coating art as applied to publication papers was in its infancy, and the high speed trailing blade coater now widely used for these grades had not yet been invented. The art had not progressed to the point of even thinking about the very high operating speeds in use today, such speeds very often exceeding 2500 feet per minute. Modern coating devices such as the trailing blade coater apply a relatively light coating to the paper, and thus require moderate coating solids (above 20%) even where the coating weights are below those conventionally applied to publication papers. Thus, a Kress coating composition is not suitable for use in a trailing blade coater because of the low solids content.

Reiling, in U.S. Patent No. 3,002,844 (reissued as Patent No. Re. 25,884 on Oct. 19, 1965), taught that an attempt to increase the solids content of the Kress coating composition by the direct addition of solids such as paper pigments resulted in an appreciable loss of brightness, opacity, and gloss, even if as little as 3% of pigment or fillers were added. Reiling further taught that the addition of a suspension of a paper pigment in an aqueous solution of a water soluble gum, to the protein, oil and water emulsion, preserved the desired paper coating properties of opacity, brightness, printability, and gloss obtained by Kress. At the same time, the Reiling composition enhanced the scuff-resistant properties of the coating and provided a relatively high solids content for the composition, so that it could be used in modern coating machinery such as the trailing blade coater.

The Kress coating composition, when applied to paper by coating methods that applied coating weights of over about two pounds per 1000 square feet, had, in addition to brightness and opacity, a very high gloss, comparable to that of cast coatings. However, these coatings were very soft and pressure-sensitive, and were not suitable for such operations as printing, scoring and folding. The addition of Reiling's gum-pigment suspension provided a means of hardening the coating, and at the same time the coating retained the high gloss and other desirable properties of the Kress coating.

The coatings resulting from the use of a Reiling-type coating composition are at times tacky or sticky in various degrees. This property creates a problem in super-calendering publication papers because of the steam used to obtain a suitable gloss. The protein and gum coating can be waterproofed by the addition of a cross-linking agent or of a metal salt capable of producing an insoluble salt of the protein used in the coating composition. The cross-linking agent is generally a donor of formaldehyde, such as a urea-formaldehyde resin, or a melamine resin. A typical metal salt is zinc sulfate. Alternately the addition of a urea-formaldehyde resin to the base stock in the process of manufacture releases sufficient formaldehyde during the drying of the coating on the paper web to substantially reduce the tackiness of the coating. When animal glue is used as the water soluble gum, the addition of this material provides a bright, opaque, glossy coating for boxboard, paperboard and the like which is sufficiently water-resistant for use in offset printing and for other uses to which such boards are normally put. Although the addition of this type of material is usually desirable, it is not necessary for the practice of my invention.

Reiling strongly emphasized two basic limitations to his invention. First of all, he insisted that the order of adding the pigment to the emulsion was critical. According to Reiling, in order to achieve the claimed improved results, it was imperative that the solution of the water soluble gum and the suspension of the paper pigment be mixed together before being added to the previously prepared protein, oil and water emulsion. He taught that the gum had to be mixed with the pigment so that the protein would adhere to the surface of the pigment.

I have discovered that the water solution of the gum can be added to protein, oil and water emulsion separately before the pigment suspension is added without losing or lessening the benefits discovered by Reiling.

I have also discovered that all of the gum solution can be added to the alkaline solution of the protein before the addition of an emulsification of the liquid hydrocarbon, and that the pigment suspension can thereafter be added alone to the emulsion, with results equal to those taught by Reiling.

Therefore, contrary to the teachings of Reiling, the particular order in which the protein, the water soluble gum, the pigment and the oil are added to the composition, is not critical as far as final results are concerned.

Secondly, Reiling taught that in order to obtain his results, the ratio of gum to pigment had to be at least 20%. I have discovered that in the case of certain water soluble gums, equivalent (and sometimes better) results can be obtained with a much smaller percentage of gum. Reiling therefore not only failed to recognize that the order of adding ingredients was not critical, but also failed to recognize or discover that as little as 5 or 6% of gum to pigment would produce a completely satisfactory coating. Since the gum is the most expensive ingredient of the composition, a reduction in quantity of this magnitude constitutes a considerable economy.

It is, therefore, a primary object of this invention to provide a coating composition having a gum to pigment ratio of less than 20% that is more economical to use, and that will result in a bubble coating having properties equivalent to those coatings that contain the larger amount of gum considered necessary prior to my invention.

A further object of this invention is to provide new and more simple methods of preparing emulsion coating compositions suitable for coating light-weight publication papers for use in magazines or catalogs printed by the letterpress, rotogravure or web offset processes on high speed presses.

A further object of this invention is to provide new and unique methods of preparing coating compositions that contain less than a 20% ratio of water soluble gum to pigment, which compositions will result in a bright, opaque, and glossy coating for use on any variety of paperboard, including the complete range from light-weight cigarette board up to and including building boards and ceiling tile.

A further object of this invention is to provide a bubble coating in the form of a generally continuous film comprising a mixture of a water soluble gum, an alkali soluble, water-insoluble protein, and a paper pigment in which the ratio of gum to pigment is from 5 to 20% by weight.

In this specification I use the words, "paper pigment" to include the finely subdivided, solid, substantially insoluble materials that are commonly used for surface treating of paper webs, including but by no means limited to kaolin clay, chalk (precipitated or ground calcium carbonate), titanium dioxide, satin white, barium sulfate, hydrated alumina, talc, and the like, and any mixtures of these.

I use the term "alkali soluble, water insoluble protein" in the same sense as it is in the Kress et al. patent to refer to a conventional proteinaceous material that dissolves in an aqueous solution having a pH above 7. Examples are alpha and soya protein in either unmodified or modified forms, casein, and any mixtures or equivalents thereof. Although I have used solely soya protein in my specified examples, it can be seen from the prior art that alpha protein and casein are used extensively for the same purpose and are therefore equivalent. Hence, for the purposes of this invention, the word "alkali" or equivalent refers to a material having the capacity to release hydroxyl ions in solution—i.e., a conventional base. The preferred alkali is ammonium hydroxide, but this can optionally be replaced in whole or in part by other alkaline materials, such as caustic soda, sodium carbonate, borax, disodium phosphate, sodium silicate, etc., or any other alkalis normally employed for dissolving water insoluble proteins.

By the word "gum" I have reference to the conventional meaning of this term in the paper industry whereby reference is had to a generally high molecular weight, organic material of natural or synthetic origin which is water soluble and adapted for use as an adhesive. Water soluble gums are used in this invention. The minimum solubility in water of a gum in any given formulation of this invention depends simply upon the quantity of gum to be used in that formulation. As those skilled in the art will appreciate, the dissolution of some gums in water requires considerable heat and time, and sometimes considerable shear, as with a good agitator. However, a water soluble gum requires neither acid nor alkali for its dissolution. Thus, the term includes but is not limited to animal glues, polyvinyl alcohol in any variety available, methyl cellulose carboxymethyl cellulose, hydroxyethyl cellulose, and any mixtures and equivalents of these substances. It is understood that the choice of a given gum on modification thereof for use in this invention will depend on its suitability for a particular formulation as judged by the quantity required from an economics point of view, its solubility under the conditions of the formulation, its effect on the viscosity of the final coating composition, and other properties that will be evident to one skilled in the art.

The term "liquid hydrocarbon" I use herein in its conventional sense to refer to an inert, oily, water insoluble, volatile liquid consisting substantially of carbon and hydrogen. Any of a wide range of hydrocarbons can be used, both aliphatic and aromatic. The liquid hydrocarbon must have a boiling point above that of water. The final choice of the liquid hydrocarbon will depend upon such factors as toxicity, flash point, availability at a reasonable price and in adequate quantities and the Lower Explosive Limit. The LEL of the liquid hydrocarbon should be considered in determining its commercial suitability, since the exhaust system of the coater drier must remove the hydrocarbon vapor at the same rate at which it is evaporated from the emulsion coating to prevent a build-up of concentration which would create an explosion hazard. Other considerations governing the choice of the liquid hydrocarbon will be obvious to those skilled in the art. Suitable liquid hydrocarbons include but are not limited to petroleum distillate fractions having flash points between 100° F. and 250° F., such as kerosene, diesel oil, fuel oil, mineral spirits, and synthetic aliphatic hydrocarbons, xylene and mixtures and equivalents thereof.

The term "paper" I use herein in its conventional sense as defined in the "Dictionary of Paper," 2nd edition, page 262, American Paper and Pulp Assoc., New York, 1951, referring to substances consisting largely of fibers interwoven and bound, pressed or molded into a compact web by chemical and mechanical processes from fibrous materials. Thus, the term "paper" includes not only cellulosic material in sheet form but also paperboard, cardboard, wallboard, and the like.

It is well-known that the film resulting on the substrate after coating it with a composition such as described in this invention is a more or less continuous film containing the alkali soluble, water insoluble protein, the water soluble gum, and the pigment more or less uniformly distributed, with multitudinous small bubbles of air creating air-binder interfaces uniformly scattered throughout the film. The size of these air bubbles corresponds to the size of the globules of liquid hydrocarbon which formed the discontinuous phase of the composition. The size of these air bubbles is on the order of one micron. The mechanism of the formation of this type of film is discussed in the Clancy et al. Patent No. 3,157,533. Since the mechanism is well known to those skilled in the art, it need not be elaborated on further here.

I make my protein solution in the conventional manner, by dispersing the protein in cold water and agitating until the protein is thoroughly wetted out, then heating to about 140° F. and adding 12% of 26° Bé. ammonium hydroxide to dissolve the protein. After the dissolution is complete, anhydrous ammonium stearate can be added to act as an emulsifying agent and to also act as a plasticizer for the final coating. Other emulsifying agents such as ammonium oleate, or other surface active agents such as are familiar to anyone skilled in the art can also be used. Also, an emulsifying agent such as ammonium stearate can be formed in situ by adding an excess of ammonium hydroxide to the protein and suspending stearic acid in the liquid hydrocarbon. However, it is not necessary to use any emulsifying agent in carrying out this invention.

The liquid hydrocarbon should be added with high-shear agitation so that complete emulsification is achieved. It is this agitation that will determine the size of the oil globules which in turn will determine the size of the bubbles in the dry coating.

The water soluble gum is generally first slurried in cold water for a time sufficient to thoroughly wet out the gum, and then the mass is heated to the temperature required for dissolution of the particular gum, and held at that temperature until solution is complete. The heating may be accomplished by direct or indirect steam, or by the use of a "jet" cooker familiar to those skilled in the art, either at atmospheric or at higher pressures. Then the gum solution is added directly to the other ingredients without further cooling, using agitation adequate to thoroughly mix the gum solution into the composition. Animal glue is also commercially available as a 50% solution in water, containing urea or other substances as thinning agents. This 50% solution, which is fairly fluid at room temperature, may be added directly without dilution. Alternately, urea, dicyandiamide or other thinning agents may be used in preparing a solution from the dry gum.

The paper pigment is generally prepared as a 70% suspension in water, using such well-known peptizing agents as tetra sodium pyrophosphate or sodium hexametaphosphate. Suspensions of clay, calcium carbonate, and titanium dioxide can be prepared at 70% solids by following well-known techniques. 70% suspensions of coating clay are available commercially, and these may also be used in practicing this invention. The prepared pigment suspension is added with agitation to thoroughly intermix the composition.

The following examples will serve to illustrate typical procedures and to compare the results of my invention. They are meant to be illustrative, and not limiting. See Table I for a summary of each example.

Example I

This example illustrates for comparison purposes a typical Reiling coating composition using soya protein, animal glue, and clay.

About 45 pounds of extra low viscosity soya protein ("Delta" Protein, Central Soya Co.) are added to 14 gallons of water, and the mass agitated for 30 minutes, and then heated to 140° F. using direct steam. 5.4 pounds of 26° Baumé ammonium hydroxide are then added and the agitation continued until the protein is completely dissolved. 1.25 pounds of anhydrous ammonium stearate are then added. 40 pounds of an isoparaffinic liquid hydrocarbon having a flash point of 138° F. and an average boiling point of 401° F. (Certrex 39, Mobil Oil Company) are then added to the protein solution, and the agitator speeded up to thoroughly emulsify the oil in the protein solution.

96 pounds of a previously prepared 70% aqueous suspension of predispersed coating clay (Hydrasperse, J. M. Huber Corp.) is screened into a separate tank, and 30 pounds of a 50% solution of animal glue (TPC 2226, Swift and Company) is added. The mass is agitated to insure thorough mixing.

As taught by Reiling, the glue-clay suspension is added to the protein-oil emulsion and the mass is thoroughly mixed and then cooled. Immediately before use, 3 pounds of a melamine resin (Scripset 100, Monsanto Chemical Company) is added. The resulting pigmented emulsion is then applied to an approximately 30 pound (25 x 38—500 basis) publication base stock on a trailing blade coater, at a speed of about 2200 feet per minute. The total amount of coating deposited on both sides of the base paper amounted to 5.4 pounds per ream, resulting in a final weight of 35.5 pounds per ream.

The coated paper is then supercalendered at a speed of 1300 feet per minute and a bottom nip pressure of 1440 pounds per linear inch. The finished paper has ink holdout, resistance to ink showthrough, and opacity equivalent to that of a conventional sheet weighing 40 pounds per ream.

Example II

This example illustrates a coating composition having the same composition as Example I. The difference lies in the fact that here the glue and pigment were not mixed together before being added to the emulsion as was done in Example I.

The protein, oil and water emulsion is prepared as in Example I.

Then 30 pounds of a 50% solution of animal glue (TPC 2226, Swift and Company) are added directly to the emulsion.

96 pounds of a previously prepared 70% aqueous suspension of coating clay (Hydrasperse, J. M. Huber Corp.) is screened into a separate tank, and its pH adjusted to 9.8 with ammonium hydroxide. The clay suspension is then added to the protein, oil and water emulsion containing the animal glue solution. 4 gallons of water are then added to adjust the solids and viscosity. 3 pounds of a melamine resin (Scripset 100, Monsanto Chemical Co.) are added, and the resulting pigmented emulsion coating is then applied to the same publication base stock on a trailing blade coater at a speed of about 2300 feet per minute. The total amount of coating applied to both sides of the base paper amounted to 4.9 pounds resulting in a final weight of 35.2 pounds per ream. The coated paper is then supercalendered under the conditions of Example I, and the finished paper had opacity and printability equal to that of the Reiling coating of Example I.

Example III

This example illustrates another variation in the process of mixing the composition of Example I.

The protein is dissolved in alkali solution as in Example I, and the ammonium stearate added. 30 pounds of the same 50% solution of animal glue are then added and thoroughly mixed with the protein solution. 40 pounds of the same liquid hydrocarbon are then added and the agitator speeded up to emulsify the oil in the protein solution. 96 pounds of the same 70% clay suspension are then added and intermixed. The melamine resin is then added together with 2 gallons of water, and the resulting emulsion coating applied to publication base stock and supercalendered as in Example I. The resulting paper weighed 36.0 pounds per ream, and had properties equilvalent to those obtained in Examples I and II.

Example IV

This example illustrates a coating composition according to this invention using soya protein, polyvinyl alcohol, and clay, showing that the ratio of gum to pigment can be less than the 20% stated to be necessary by Reiling.

The protein, oil, and water emulsion is prepared as in Example I.

96 pounds of a previously prepared 70% aqueous suspension of predispersed coating clay (Hydrasperse, J. M. Huber Corp.) is screened into a separate tank, and 6.7 pounds of medium viscosity polyvinyl alcohol (71–30, Du Pont Co.) were added with considerable agitation. The mass was then heated to 190° F. and held at this temperature for 30 minutes to dissolve the polyvinyl alcohol.

The polyvinyl alcohol-clay suspension, after the addition of water to adjust the solids to 50%, is then added to the protein-oil emulsion, the melamine resin added, and the resulting coating composition applied to publication base stock followed by supercalendering as in Example I. The resulting paper weighed 34.4 pounds per ream, and had excellent ink tests and opacity.

Example V

This example illustrates a typical coating composition of this invention using soya protein, polyvinyl alcohol, and clay.

The protein, oil, and water emulsion is prepared as in Example I.

Then 6.7 pounds of the same polyvinyl alcohol used in Example IV were dispersed in 7 gallons of water and the mass heated to 195° F. and held at this temperature for 30 minutes to dissolve the polyvinyl alcohol. This solution is then added to the protein-oil emulsion.

96 pounds of clay suspension were added as in Example II, and the resulting pigmented emulsion coating composition is then applied to the same publication base stock as in Examples I and II, at a speed of 2300 feet per minute on a trailing blade coater. The total amount of coating applied to both sides of the base paper amounted to 4.0 pounds, resulting in a final weight of 34.9 pounds per ream. The coated paper was then supercalendered under the same conditions as in Example I. The resulting paper had opacity and printability equivalent to that of the product of Example IV.

Example VI

This example illustrates a variation in the process of mixing the composition of this invention.

The ingredients of Example V were used. The solution of polyvinyl alcohol was added to the protein solution before the oil was added, as in Example III. The same amount of clay suspension was added, and the resulting emulsion coating was then applied to the same publication stock as in Examples I–V by a trailing blade coater at a speed of 2300 feet per minute. The coated paper was then supercalendered, and the resulting paper had opacity and printability equal to that obtained in Example IV.

The following examples again illustrate the use of less than 20% of gum based on pigment.

Example VII

The procedures of Example I were carried out exactly, except that 7.5 pounds of the same 50% solution of animal glue were used.

Example VIII

The procedures of Example I were followed, except shows, when considered in relation to the super. opac., how much opacity has been lost in the supercalendering operation. A small loss is desirable, of course.

Examples II and V illustrate my discovery that it is not necessary to follow Reiling's teachings regarding mixing the gum solution with the pigment suspension prior to being added to the protein, oil, and water emulsion, and show that equivalent results are obtained when the gum solution is added first to the emulsion, and then the pigment suspension added separately.

A comparison of Examples III and VI, with the corresponding prior art formulations, illustrates my discovery that the gum solution can also be added directly to the protein solution before the oil is added and emulsified, and the pigment suspension added separately to the emulsion.

Examples IV, V, VI, VII, VIII and IX illustrate my discovery that excellent coatings will result from the use of a ratio of less than 20% of water soluble gum to pigment. Example VII achieves the desired results by using a weight of water soluble animal glue equivalent to 5.5% of the weight of pigment. Example IX achieves similar results with an amount of polyvinyl alcohol equal to 6% of the weight of pigment used. The results attained through the use of such a small percentage of water soluble gum were completely unexpected in view of the teachings of the prior art.

TABLE I

| Example | I[1] | II[2] | III[2] | IV | V | VI | VII | VIII | IX |
|---|---|---|---|---|---|---|---|---|---|
| Gum type | Glue | Glue | Glue | PVA | PVA | PVA | Glue | Glue | PVA |
| Protein (lbs.) | 45 | 45 | 45 | 45 | 45 | 45 | 45 | 45 | 45 |
| Oil (lbs.) | 40 | 40 | 40 | 40 | 40 | 40 | 40 | 40 | 40 |
| Gum (lbs.) | 15 | 15 | 15 | 6.7 | 6.7 | 6.7 | 3.75 | 7.5 | 4 |
| Clay (lbs.) | 67 | 67 | 67 | 67 | 67 | 67 | 67 | 67 | 67 |
| Water (lbs.) | 160 | 193 | 177 | 219 | 204 | 204 | 149 | 153 | 219 |
| Base opacity | 85.0 | 85.5 | 86.0 | 86.0 | 85.0 | 85.0 | 85.0 | 84.0 | 86.0 |
| Unsuper. Opac | 90.0 | 90.5 | 91.0 | 90.5 | 90.0 | 91.0 | 91.0 | 90.5 | 90.5 |
| Super. Opac | 89.5 | 88.0 | 89.4 | 88.5 | 88.5 | 87.6 | 88.2 | 89.1 | 89.5 |
| Super wgt., lbs./ream | 35.5 | 35.2 | 36.0 | 34.4 | 34.9 | 34.8 | 33.0 | 32.4 | 34.9 |
| Gloss | 37/41 | 35/48 | 38/39 | 42/53 | 38/50 | 39/50 | 36/44 | 32/30 | 40/42 |
| Holdout | 58/55 | 55/54 | 59/51 | 61/62 | 55/56 | 56/57 | 57/56 | 55/23 | 56/53 |
| Showthru | 91/89 | 88/88 | 90/89 | 89/90 | 89/89 | 88/88 | 89/88 | 91/89 | 90/89 |
| Gum/pigment (percent) | 22 | 22 | 22 | 10 | 10 | 10 | 5.5 | 11 | 6 |
| Solids (percent) | 39 | 35 | 37 | 31 | 33 | 33 | 38 | 38 | 31 |

[1] Prior art composition and process. [2] Prior art composition.

that 15 pounds of the same 50% glue solution were used.

As compared to the paper obtained in Example I, the papers from Examples VII and VIII were equivalent in opacity and in printability tests.

Example IX

The procedures of Example IV were followed except that 4 pounds of polyvinyl alcohol were used. The resulting supercalendered paper had properties equivalent to those obtained in Example I.

Table I gives a summary of the formulations and the opacity and ink tests of Examples I–IX. The gloss, ink holdout, and ink showthrough tests are reported for the top/wire sides of the finished, supercalendered sheets. In interpreting the holdout and showthrough results, the higher the figure the better the holdout or resistance to showthrough. In general, for publication papers, the holdout figure should be above about 50, and the showthrough figure should be above about 88.

"Base opacity" indicates the opacity of the base sheet before the application of coating. "Unsuper. opac." indicates the opacity of the paper after coating on both sides but before the supercalendering operation. "Super. opac." indicates the opacity of the paper after the supercalendering operation. This is the final result on the paper ready for printing. Naturally, the higher the base opacity the better, but this is not a function of the coating. The super. opac. should be above 88, and preferably as high as 90. The unsuper. opac. shows the increase in opacity due to the coating over the base opacity, and it also In practicing my invention, the proportions of the various ingredients can be varied over a rather wide range. Since the preparation and use of paper coating compositions of the type described herein is somewhat of an art as well as a science, the proper proportions for any particular application will have to be determined after consideration of such factors as the type of substrate being coated, the type of coating device being used, the weight of coating desired, and cost. As a practical matter, the use of too much oil softens the coating and reduces the pick test. The use of too much pigment, while less expensive, lowers the gloss and generally tends toward the properties of conventional coatings. The use of too much gum can quickly become prohibitively expensive. Too much gum can also raise the viscosity beyond the operable point. The following table shows proportions that are preferred for the best commercial results, and also shows wider ranges that may be used for some purposes.

TABLE II

| | Percent |
|---|---|
| Oil to protein: | |
|   Preferred range 0.9 to 1.0 up to 1.25 to 1.0 | 90 to 125 |
|   Possible range 0.6 to 1.0 up to 6 to 1 | 60 to 600 |
| Gum to pigment: | |
|   Preferred range 1 to 10 up to 2 to 10 | 10 to 20 |
|   Possible range 1 to 20 up to 3 to 2 | 5 to 150 |
| Pigment to protein: | |
|   Preferred range 1 to 1 up to 1.5 to 1 | 100 to 150 |
|   Possible range 0.5 to 1.0 up to 5.0 to 1 | 50 to 500 |

In all cases, water is added to the coating composition at some stage in the process to adjust the solids content to the proper level. The solids include the total weight of protein, gum and pigment. The solids content (percentage) is computed by dividing the weight of solids by the total weight of solids plus liquids. It is possible to use between 10% and 50% solids but the preferred range is from 20% to 40%.

What is claimed is:

1. In the process of making a coating composition suitable for use in coating publication papers, which composition is an oil-in-water emulsion containing oil, water, pigment, water-soluble gum, and an alkali soluble, water-insoluble protein which has been made water soluble by pH adjustment, the improvement which comprises the steps of:
   (a) forming an oil-in-water emulsion containing the water-soluble protein and all of the gum, said gum being selected from the group consisting of animal glues, polyvinyl alcohols, methyl celluloses, carboxymethyl celluloses and hydroxyethyl celluloses; and
   (b) thereafter adding said pigment to said oil-in-water emulsion of step (a)

2. Improved processes of claim 1 wherein the gum is mixed with an alkaline aqueous solution of the protein before forming the oil-in-water emulsion of step (a).

3. Improved processes of claim 1 wherein the amount of gum used in preparing said coating composition is less than 20% based on the weight of the pigment.

4. Improved processes of claim 1 wherein the amount of gum used in preparing said coating composition is from 5.5% to 11% based on the weight of the pigment.

5. Improved processes of claim 1 wherein:
   (a) said protein is alpha protein, soya protein or casein;
   (b) said gum is animal glue or polyvinyl alcohol; and
   (c) said oil is a liquid hydrocarbon having a boiling point above that of water and a flash point of 100°–250° F.

References Cited

UNITED STATES PATENTS 3,002,844  10/1961  Reiling _____ 106—148
3,157,533  11/1964  Clancy et al. _____ 117—156

OTHER REFERENCES

Condensed Chem. Dict., p. 1204, 6th ed., 1961.

JULIUS FROME, Primary Examiner

T. MORRIS, Assistant Examiner

U.S. Cl. X.R.

106—141, 148; 117—156; 260—8